United States Patent [19]

Jadwin et al.

[11] E Re. 31,072

[45] Reissued Nov. 2, 1982

[54] ELECTROGRAPHIC DEVELOPING COMPOSITION AND PROCESS

[75] Inventors: Thomas A. Jadwin; Ravi Khanna; Stewart H. Merrill; Edmond S. Perry, all of Rochester, N.Y.

[73] Assignee: Eastman Kodak Company, Rochester, N.Y.

[21] Appl. No.: 763,962

[22] Filed: Jan. 28, 1977

Related U.S. Patent Documents

Reissue of:

[64] Patent No.: 3,938,992
Issued: Feb. 17, 1976
Appl. No.: 498,818
Filed: Aug. 19, 1974

U.S. Applications:

[63] Continuation-in-part of Ser. No. 380,317, Jul. 18, 1973, abandoned.

[51] Int. Cl.[3] ..... G03G 9/10; G03G 9/14

[52] U.S. Cl. ..... 430/99; 430/106.6; 430/109; 430/122; 430/137

[58] Field of Search ..... 252/62.1 P; 427/14, 427/19, 18, 20, 21; 96/15 D; 430/106.6, 109

[56] References Cited

U.S. PATENT DOCUMENTS

| | | | |
|---|---|---|---|
| 2,701,245 | 2/1955 | Lynn | 260/89.5 |
| 3,190,850 | 7/1965 | Burke | 260/38 |
| 3,338,991 | 8/1967 | Insalasco et al. | 264/7 |

FOREIGN PATENT DOCUMENTS

| | | |
|---|---|---|
| 959695 | 12/1974 | Canada . |
| 2401766 | 7/1974 | Fed. Rep. of Germany . |
| 2214140 | 1/1974 | France . |

*Primary Examiner*—Roland E. Martin, Jr.
*Attorney, Agent, or Firm*—William T. French

[57] ABSTRACT

The present invention relates to an electrographic developing composition containing finely divided carrier particles and finely divided toner particles having incorporated therein a fusible, crosslinked binder polymer. An improved electrographic developing process using such toner particles is also disclosed.

33 Claims, No Drawings

ELECTROGRAPHIC DEVELOPING COMPOSITION AND PROCESS

Matter enclosed in heavy brackets [ ] appears in the original patent but forms no part of this reissue specification; matter printed in italics indicates the additions made by reissue.

This application is a continuation-in-part of U.S. Ser. No. 380,317 filed July 18, 1973, now abandoned.

FIELD OF THE INVENTION

The present invention relates to electrography and particularly to the dry development of electrostatic charge patterns.

DESCRIPTION OF THE PRIOR ART

Electrographic imaging and developing processes, for example electrophotographic imaging process and techniques, have been extensively described in both the patent and other literature, for example, U.S. Pat. Nos. 2,221,776 issued Nov. 19, 1940; 2,277,013 issued Mar. 17, 1942; 2,297,691 issued Oct. 6, 1942; 2,357,809 issued Sept. 12, 1944; 2,551,582 issued May 8, 1951; 2,825,814 issued Mar. 4, 1958; 2,833,648 issued May 6, 1958; 3,220,324 issued Nov. 30, 1965; 3,220,831 issued Nov. 30, 1965; 3,220,833 issued Nov. 30, 1965 and many others. Generally these processes have in common the steps of forming a latent electrostatic charge image on an insulating electrographic element. The electrostatic latent image is then rendered visible by treatment with an electrostatic developing composition or developer.

Conventional developers include a carrier that can be either a triboelectrically chargeable, magnetic material such as iron filings, powdered iron or iron oxide, or a triboelectrically chargeable, non-magnetic substance like glass beads or crystals of inorganic salts such as sodium or potassium chloride. In addition to the carrier, electrostatic developers include a toner which is electrostatically attractable to the carrier. The toner is usually a particulate polymeric material which may, if desired, be suitably darkened or colored for image viewing purposes with a colorant such as dyestuffs or pigments, for example, carbon black.

To develop an electrostatic image, the dry developer can be applied imagewise to the electrostatically charged surface by various techniques. One such technique is known as cascade development and is described in U.S. Pat. No. 2,618,552, issued Nov. 18, 1952.

Another suitable developing technique is known as magnetic brush development and is described in U.S. Pat. No. 3,003,462, issued Oct. 10, 1961.

In conventional electrophotographic applications, the developed image is formed on a photoconductive element and is transferred to a receiving sheet. The image thus transferred is then fixed, ie. made permanent typically by heating to fuse the transferred image. Thus, the toner material must be capable of being fused under temperature conditions which will avoid any charring, burning or other physical damage to the receiver sheet which is typically formed of paper.

A variety of processes and apparatus have been described in the electrographic art for accomplishing fixing of the transferred image. Typically this is accomplished by the combined application of heat and pressure, for example, by bringing the receiving sheet containing the transferred developed toner image into contact with a heated fusing roller. In addition to the use of a heated fusing roller other devices may be utilized for the fixing of the developed toner image such as contacting the developed toner image with a heated platen or some other similar heated member.

In any case, regardless of the type of heated fusing member employed, it has been recognized in the electrographic art that there exists a substantial problem associated with the "off setting" of individual toner particles of the developed image during the fixing operation. Off-setting is the undesirable transfer of toner particles from the developed toner image carried on a receiving member (e.g. copy sheet) to the surface of the heated fusing member. The surface of the fusing member therefore becomes contaminated with toner particles; and, upon further use of such a contaminated fusing member, it is found that these toner particles adhered to the surface of the fusing member are transferred to subsequent copy sheets or receiving members. As a result, either a ghost image of previously fixed images is formed on subsequent copy sheets, or undesirable deposits of toner material are formed in background areas of subsequent copy sheets, i.e. scumming or discoloration occurs in background areas of subsequent copies.

SUMMARY OF THE INVENTION

In accord with the present invention, an improved developing composition comprising finely divided carrier particles and finely divided crosslinked toner particles and an improved development process using such toner particles have been discovered. The finely divided crosslinked toner particles useful in the present invention comprise a fusible binder polymer, the molecular chains of said binder polymer being crosslinked to an extent sufficient to extend the useful fusing range of said crosslinked toner particle by at least about 10° C. relative to comparable uncrosslinked toner particles comprising an identical binder polymer except that the molecular chains thereof are uncrosslinked as are conventional toner binder polymers.

The bond strength or bond energy of the individual crosslinks characteristically present in the crosslinked binder polymers used in the invention should be greater than about 8 kcal./mole. This is because polymers which contain only "weak crosslinks" having a bond energy of less than about 8 kcal./mole, for example, polymers in which the only linkage between individual polymer chains is through hydrogen bonding, are insufficiently linked together to result in any substantial increase in the useful fusing range of the resultant polymer. In accord with an especially preferred embodiment of the present invention, the crosslinked binder polymers used in the invention are crosslinked by covalent chemical bonding.

In accord with an especially preferred embodiment of the invention, the finely divided toner particles employed in the invention comprise a colorant and at least about 50 percent by weight of a covalently crosslinked fusible styrene-containing binder polymer. These preferred styrene-containing binder polymers are crosslinked to an extent sufficient to provide a useful fusing [rnage] *range* of at least about 90° C. and to extend the useful fusing range of the toner particles by at least about 20° C. relative to comparable uncrosslinked toner particles comprising the same styrene-containing polymer, except in uncrosslinked form.

DESCRIPTION OF PREFERRED EMBODIMENTS

It has been found unexpectedly that by crosslinking the molecular chains of the binder polymer material used in dry electrographic toner compositions, one is able to extend the useful fusing range over which such toner particles may be fused and thereby fixed to a receiving member. By extending the useful fusing range of an electrographic developing composition, the range of permissible variation in surface temperature of a fusing member which is utilized to fix such a developer composition is increased. As a result, it is found that the temperature range over which little or only minimal toner off-set occurs is extended, thereby eliminating or substantially reducing the amount of toner off-set which is encountered when using a conventional developing composition containing uncrosslinked or merely surface crosslinked polymeric toner particles.

To applicants' knowledge, the electrographic dry developing art, has generally completely avoided the use of any type of crosslinked polymeric toner particles, except in a very few specialized situations. For example, in Wright and Olson, U.S. Pat. No. 3,676,350, issued July 11, 1972, it is noted that certain polymeric toner particles subjected to a glow discharge treatment may be surface crosslinked to improve the resistance of these toner particles to caking. And, in Hagenbach et al., U.S. Pat. No. 3,533,835, it is noted that poly(amide) resins may be used to prepare fusible toner particles. Poly(amide) resins, as is well-known, are characterized by the presence of hydrogen bonding between adjacent polymer chains. These hydrogen bonds are sometimes thought of as weak crosslinks. However, toner particles which are only surface crosslinked as in the aforementioned Wright and Olson patent and toner particles which possess only hydrogen bonding have not been found to provide the increase in useful fusing range [characteristics] *characteristic* of the present invention.

Similarly, although it has been recognized that crosslinking certain specialized kinds of thermosetting polymeric toner particles, such as diallyl phthalate or isophthalate toner particles, might enhance the storing characteristics of a permanent image composed of these particular kinds of thermosetting materials, crosslinking of these thermosetting toner particles has previously been carried out only after formulation of the toner particles and after the formation of a developed toner image as described in Fr. Pat. No. 2,083,064, dated Dec. 10, 1971. See also Br. Pat. No. 1,174,571, at page 3, lines 90–97.

Several reasons are apparently responsible for the notion that crosslinked toner materials are generally not suitable for conventional electrostatic developing and fixing operations. A primary reason is probably the belief that crosslinking the toner would increase its melt temperature and require substantially higher fixing temperatures. This, of course, would be undesirable, especially where the receiving member to which the toner is to be fixed has a low char point, e.g. plain paper.

Another primary reason for this widely held view is simply that crosslinking the polymeric toner particle would be expected to provide a material that could not easily be rendered molten. By crosslinking the toner polymer, one would expect to reduce its thermoplastic character and to obtain a polymer particle tending to behave as if it were a thermoset polymeric particle. In such case because of its thermoset character one would expect the crosslinked polymer to be substantially infusible, i.e., it could not easily be rendered molten and therefore could not be satisfactorily fixed to a support.

Still another reason for this view is that one might expect a crosslinked toner particle even if it somehow could be rendered molten to require an increased amount of heating time to satisfactorily fuse to a receiving member in comparison to an uncrosslinked or merely surface crosslinked particle. Such increased fixing times would so prolong the fixing operation as to make such toner materials unacceptable in high speed copy systems.

One recent publication which does discuss the use of certain types of "weak crosslinks" in toner materials is Strella et. al. Belgian Pat. No. 793,554 which corresponds to Strella et. al., U.S. Pat. No. 3,804,764 issued Apr. 16, 1974. This publication is primarily concerned with the use of "weakly crosslinked" toners to provide a pressure-fixable toner.

In this regard, it is recognized that ionic crosslinks, i.e. crosslinks formed by ionic bonding, are useful in the present invention to provide an effective increase in the useful fusing range of a fusible toner and that ionic crosslinks are also alleged by Strella et. al. as one type of "weak crosslink" useful to provide a pressure fixable toner. However, the crosslinks, including the ionic crosslinks, employed in the toner materials used in the present invention are retained and are not disrupted and/or broken during fixing, e.g. roller-fusing, and are essential thereto because it is the presence of these crosslinks in the toner polymer which, during fixing, provides the desired increase in useful fusing range. In contrast, as stated by Strella et. al., the so-called "weak crosslinks" used by Strella et. al. are "temporarily disrupted and/or broken" by the application of pressure so that during fixing of the Strella et. al. "weakly crosslinked" toner, the toner polymer "has the properties of the uncrosslinked polymer." Moreover, hydrogen bonding which is alleged by Strella et. al. to represent one type of useful "weak crosslink" has been found ineffective in the present invention, ie. hydrogen bonding does not represent a crosslink which provides any substantial increase in useful fusing range in the toner particles used in the present invention. In addition, covalent crosslinks which are especially effective in the present invention for providing substantial increases in the useful fusing range of a fusible toner material are expressly stated to be unsuitable for use in the "weakly crosslinked" toners described by Strella et. al. (See Col. 2, lines 57–69, U.S. Pat. No. 3,804,764).

The term "useful fusing range" employed herein is defined in terms of the following roller fuser test: The fusing properties of each sample toner are evaluated by a standard test contact roller fuser apparatus. The test contact roller fuser comprises a cylindrical steel pressure roll coated with a copolymer of tetrafluoroethylene and fluorinated ethylene propylene (e.g., TEFLON FEP a trademark of the E. I. DuPont de Nemours Co.) and a cylindrical resilient fusing roll. The two rolls are mounted such that their central axes are parallel to one another and with their external roller surfaces in contact. The fusing roller has an external silicone rubber surface layer composed of a silicone rubber such as that available under the trademark of ECCOSIL 4952 from the Emerson-Cumming Co., which has been ground down from an initial thickness to approximately 0.13 cm. Surface speed of the pressure roll and fusing roll is 5 inches per second. The pressure roll is regulated to apply a pressure of 15 pounds per lineal inch at the nip formed by the interface of the pressure roll and fusing roll. The outside diameter of the pressure roll is about 5.08 cm. and the outside diameter of the fusing roll is about 7.94 cm. The fusing roll may be heated by various means, for example, by radiant heating using an infrared lamp. Surface temperature of the fusing roll is monitored by a thermocouple contacting the roll.

Before actual testing of toner samples, the test fusing roll is conditioned by (a) passing 100 sheets of blank paper through the roll while maintaining the surface temperature of the roll at 177° C. followed by (b) passing 50 sheets of paper completely toned with Xerox 3600–7000 toner to provide toned solid areas having a reflection optical density of 0.9 as read by a Macbeth Quantalog Model RD-100R Reflection Densitometer.

Each sheet of paper which is used to condition the fusing roll and which is used to carry out the fusing test described below is a sheet of white, 20 weight bond paper such as that available commercially as International Xerographic white, Substance 20. Toner, if applied to this paper, is applied to that side of the paper which bears a correct reading water mark.

Each toner sample to be tested is ground in a fluid energy mill to a particle size as measured by Coulter Counter of 2 to 40 microns. A toned, solid area, rectangular test band approximately 1.90 cm. wide and about 10 cm. long of each sample toner is then applied (by conventional electrostatic methods) to a standard 21.6 cm. [b7] *by* 27.9 cm. piece of paper. The test band is placed at the center of the paper with the long dimension of the test band parallel to the long dimension of the paper. The reflective optical density of each toned solid area test band is 0.9 as measured by the above-noted densitometer. The paper bearing the test band is then passed through the above-described contact roller fuser. A blank piece of paper having the same dimensions is fed into the roller fuser immediately following each piece of toned paper to determine whether offset of the toner from the toned paper onto the roller fuser has occurred. Any significant amount of such toner offset can be readily observed simply by visually inspecting each blank sheet of paper to see if any ghost image of the original toner test band is deposited onto the blank paper from the fusing roll. Offset is defined to have occurred when any area of the following blank sheet has toner deposited on it in an amount sufficient to produce an optical reflection density equal to or greater than 0.02 above that of the paper alone before passing through the fusing device.

To determine the useful fusing range of each different toner composition, a series of identical toned paper samples are prepared as described above for each toner composition to be tested. Each toned paper sample followed by a blank sheet of paper is then passed through the standard contact roller fuser in the manner described above. A temperature profile for each toner sample is then prepared by increasing the surface temperature of the fusing roll, beginning at room temperature, for each toned paper sample in a given series of identical toner samples. As a result, two different surface roller fusing temperatures can be pinpointed for each test composition, namely "minimum adequate fusing" (MAF) temperature and "hot offset" (HO) temperature.

The MAF temperature for each toner composition tested is defined as the lowest fusing roll temperature above room temperature at which no toner offset, as defined above, occurs and at which the toned image is adequately fixed to the paper sheet. Adequate fixing to the paper sheet is evaluated by the adhesive tape test described hereinafter.

The HO temperature for each toner composition tested is the lowest fusing roll temperature above the MAF temperature at which toner offset, as defined above, is again observed.

As noted above, adequate fixing is evaluated quantitatively in terms of an adhesive tape test. To perform the adhesive tape test a 1.27 cm. width adhesive tape of suitable adhesive quality is selected such as Bear Brand No. 303 Cellophane Tape. Each roll of tape used is checked for "adhesive quality" by applying it to a flat polished stainless steel plate with four passes at 5.08 cm/second of a 905 gram brass roller 4.45 cm. in diameter and 6.9 cm. in length. Only the weight of the roller is used in the application. The stainless steel plate has previously been degreased in acetone, washed in an aqueous detergent solution, rinsed in distilled water, and dried. The tape is immediately peeled at an angle of 180° and at a rate of 30.48 cm./minute at 50 percent relative humidity (RH) and 25° C. in an Instron testing machine. The range of the recorded peel force is the release value of the tape in grams/1.27 cm. A single isolated peak or valley on the Instron strip chart recording is not included in the release value, nor are the first or last 1.27 cm. of the peeled tape. Tapes which are acceptable for use will have a release value of 300–475 grams/1.27 cm. when tested in this manner.

Each toned image for which adequate fixing is to be evaluated is equilibrated at 25° C. and 50 percent RH for at least a day prior to testing. 1.27 cm. width adhesive tape of suitable adhesive quality is applied to the toned image with four passes at 5.08 cm/second using the weight of the previously described brass roller. The tape is immediately peeled at an angle of 180° at a speed of 15.24 cm/minute. The test is invalid if paper fibers are removed during the peeling. The optical reflection density is read in several places where the tape was removed and an average is taken.

Fixing quality is defined as:

$$\text{Fixing Quality} = \frac{\text{Image Density After Tape is Removed}}{\text{Image Density Before Tape is Applied}}$$

The minimum temperature for adequate fixing is defined as the lowest fusing roll temperature that will give a fixing quality of greater than 0.50.

Useful fusing range for a given toner composition is then expressed as the difference between the HO temperature and the MAF temperature. No offset [is] *as* defined above occurs within this useful fusing range. As indicated, the crosslinked molecular chains of the polymeric binder contained in the crosslinked toner compositions of the present invention exhibit at least a 10° C. increase in useful fusing range and, as a consequence, improved resistance to toner offset. (This improvement in resistance to offset is sometimes referred to as increasing the offset latitude of the toner.) Those toner compositions which are found especially useful in accord with the present invention register an increase in useful fusing range in excess of 20° C. up to 40° C. and above and possess a useful fusing range of 100° C. up to 125° C. and above.

The 10° C. extension in useful fusing range exhibited by the crosslinked toner compositions used in the present invention is measured relative to a comparable uncrosslinked toner. To provide a meaningful basis for comparison, the crosslinked toner and the uncrosslinked control toner should have an identical amount of polymeric binder and the MAF temperature of the crosslinked toner and the uncrosslinked toner should be similar. Accordingly, the term "comparable uncrosslinked toner" is defined herein as a toner which (a) contains an identical amount of the same binder polymer used in the crosslinked toner, except that the binder of the uncrosslinked toner is in uncrosslinked form and (b) has a MAF temperature within ±15° C. of the MAF temperature of the crosslinked toner.

The crosslinked organic polymeric binders employed in the toner particles of the invention may be selected from a variety of crosslinked polymers including natural and synthetic polymers, crosslinked homopolymers and crosslinked copolymerized blends of two or more monomeric components, as well as mixtures of any of the foregoing materials.

The term "crosslinked" is defined herein to include both covalent crosslinking and ionic crosslinking. Both of these types of crosslinking have bond energies greater than about 8 kcal./mole. Covalent crosslinking is preferred because, among other reasons, useful covalently crosslinked polymers are generally much easier to prepare than useful ionically bonded polymers. Moreover, as indicated in the appended working examples, covalent crosslinks have generally been found to provide greater increase in useful fusing range than is obtained using ionic crosslinks. Covalent crosslinks typically have a bond energy of greater than about 40 kcal./mole and ionic crosslinks typically have a bond energy of greater than about 10 kcal./mole. As mentioned previously, polymers in which the only "crosslinks" present between individual polymer chains are linkages due to hydrogen bonding are not useful in the present invention. Hydrogen bonding generally has a bond energy of about 2–7 kcal./mole. Further details concerning the use of both covalent crosslinking and ionic crosslinking are presented hereinafter.

In accord with especially preferred embodiments of the invention, covalent crosslinking is accomplished by chemically reacting a crosslinking organic compound or compounds possessing two or more polymerizable ethylenically unsaturated groups such as divinylbenzene, 1,3-butylene dimethacrylate, and the like (hereinafter referred to as type (a) crosslinking compounds) with binder material composed of an organic compound or compounds containing one polymerizable ethylenically unsaturated group (hereinafter referred to as type (1) binder material) or by chemically reacting a crosslinking organic compound or compounds possessing a polymerizable functionality greater than two such as trimellitic anhydride or 2-hydroxy-2-methyl-1,3-propanediol (hereinafter referred to as type (b) crosslinking compounds) with polyester binder material (hereinafter referred to as type (2) binder material). The crosslinking organic compound whether type (a) or (b) is introduced for reaction with the type (1) or (2) binder material, respectively, during the actual polymerization.

In accord with the above-described embodiment of the invention wherein a separate type (a) crosslinking compound is used, one can appreciate that a variety of different such crosslinking compounds are effective. Typically, these compounds are monomeric. Representative of such materials containing two or more ethylenically unsaturated groups are vinyl compounds such as divinylbenzene; allyl-containing compounds such as triallyl cyanurate and N,N-diallylmelamine; mixed allyl-vinyl compounds such as allyl acrylate; vinylidene compounds such as ethylene glycol dimethacrylate; mixed allylvinylidene compounds such as allyl methacrylate; and mixed vinyl-vinylidene compounds such as the mixed ester prepared from ethylene glycol and acrylic and methacrylic acids. Other useful type (a) crosslinking compounds include the following; polyvinyl aromatic compounds, for example, divinyltoluene, divinylxylene, divinylethylbenzene, trivinylbenzene, divinylnaphthalene, divinylmethylnaphthalenes; the crosslinking vinyl esters, allyl esters and vinyl allyl esters of carboxylic and polycarboxylic acids including polymerizable ester monomers such as diallyl maleate, vinyl crotonate, divinyl succinate, divinyl adipate, vinyl acrylate, vinyl methacrylate; the aliphatic acetylenes such as vinylacetylene, and alpha-methyl vinylacetylene.

The amount of type (a) crosslinking compound employed in accord with this embodiment may vary substantially depending on the number of ethylenically unsaturated groups present in the compound, the reactivity of a specific crosslinking compound with a particular type (1) binder material, and the molecular weight of the particular crosslinking compound and type (1) binder material employed. Typically, amounts of crosslinking compound of at least about 0.01 weight percent, preferably 0.01 to about 5 weight percent based on the total dry weight of the type (a) crosslinking compounds blended with the type (1) binder materials are employed.

The type (1) binder material which is crosslinked in the preferred embodiment of the invention with the type (a) crosslinking compounds described above may be selected from a wide variety of known materials containing one polymerizable ethylenically unsaturated group. Typically, these materials are monomeric and contain polymerizable ethylenically unsaturated linkages, $>C{=}C<$, such as a vinyl, vinylene, or vinylidene group. A large number of these monomers are well known in the polymer art. These monomers include: monovinyl aromatic compounds such as styrene; the halogenated sytrenes such as mono- and dichlorostyrene; the alkylstyrenes such as the methylstyrenes, the ethylstyrenes, the dimethylstyrenes, the diethylstyrenes, the isopropylstyrenes, the mixed alkylstyrenes and the halogenated alkylstyrenes; nuclear-substituted vinyl aryl compounds wherein the nuclear substituent is an alkyl, aryl, alkaryl, aralkyl, cycloalkyl, alkoxy, aryloxy, chloro, fluoro, chloromethyl, fluoromethyl or trifluoromethyl group; the vinylnaphthalenes, methylvinylnaphthalenes and their halogenated derivatives; vinylaryl acids and vinylalkyl acids such as acrylic acid, and the alpha-alkyl substituted acrylic acid such as methacrylic acid, and esters of such acids and aliphatic alcohols; the amides of acrylic and methacrylic acids and derivatives thereof such as the methacrylamides, acrylamides, N-methylacrylamides, N,N-diethylacrylamide, N-ethylmethacrylamide, N,N-dimethylmethacrylamide, etc; the nitriles such as acrylonitrile, methacrylonitrile, ethylacrylonitrile, chloroacrylonitrile and other nitriles; the alkyl esters of alpha-ethylenic aliphatic dicarboxylic acids such as diethyl fumarate and diethyl itaconate; the unsaturated ketones, methyl vinyl ketone and methyl isopropenyl ketone; the vinylpyridines; the vinylquinolines; vinylfuranes; vinylcarbazoles; the esters of vinyl alcohols such as vinyl acetate; acylamino substituted acrylic and methacrylic acids; the ethers of olefinic alcohols, especially the ethers of vinyl and allyl type alcohols such as vinyl ethyl ether, vinyl butyl ether, vinyl tolyl ether, divinyl ether, methyl isopropenyl ether, methallyl ethyl ether; the unsaturated aldehydes such as acrolein and methacrolein and the like; copolymerizable alkenyl chlorides including methallyl chloride, allyl chloride, vinyl chloride, vinylidene chloride, 1-chloro-1-fluoroethylene and 4-chlorobutene-1; and the vinylindenes.

Preferred type (1) binder materials which may be used in the invention are styrene, styrene homologs and monomeric blends comprising such styrene materials. Such binder materials typically are comprised of at least about 40 up to 100 percent by weight of styrene or styrene homolog. As used in the present invention the phrase "styrene or styrene homolog" is used interchangeably with the expression "styrene materials." Styrene materials are defined herein to include a monomer or mixture of monomers having the formula

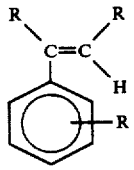

wherein R represents hydrogen, a halogen such as chlorine or bromine, a lower alkyl, including halogenated alkyls, containing 1–4 carbon atoms in alkyl moiety such as methyl, ethyl, propyl, isopropyl, butyl, and halogenated derivatives thereof. Binder materials which have been found especially useful in the invention are blends of from about 40 to about 90 percent by weight of a styrene material, preferably styrene per se, and from about 10 to about 60 percent by weight of another vinyl monomer other than styrene, for example, an alkyl acrylate or methacrylate, including branched alkyl and cycloalkyl acrylates and methacrylates such as cyclohexyl methacrylate, having up to 20 or more carbon atoms in the alkyl group. Typical of type (1) binder materials which have been found especially useful as described hereinabove are blends of 40 to 90 percent by weight styrene, from about 5 to about 50 percent by weight of a lower alkyl acrylate or methacrylate having from 1 to about 4 carbon atoms in the alkyl moiety such as methyl, ethyl, isopropyl, butyl, etc. and from about 5 to about 50 percent by weight of a higher alkyl acrylate or methacrylate having from about 6 to 20 or more carbon atoms in the alkyl group such as ethylhexyl acrylate or methacrylate. A variety of other useful styrene material containing toner particles are disclosed in the following U.S. Pat. Nos.: 2,917,460 issued Dec. 15, 1959; Reissue 25,136 issued Mar. 13, 1962; 2,788,288 issued Apr. 9, 1957; 2,638,416 issued Apr. 12, 1953; 2,618,552 issued Nov. 18, 1952 and 2,659,670 issued Nov. 17, 1953.

The type (2) polyester binder material used with the type (b) crosslinking compounds referred to above are comprised of one or more dicarboxylic acids and one or more polyhydric alcohols which are capable of reacting with one another to form a polymer having the individual units thereof linked by ester groups. Especially useful polyester binder materials are crystalline polyesters. Representative dicarboxylic acids which may be used in the preparation of the polyester binder materials are terephthalic acid and isophthalic acid including substituted terephthalic and isophthalic acid; cyclohexane dicarboxylic acid, and the like. Representative polyhydric alcohols which may be used in the preparation of the polyester binder materials are aromatic alcohols such as a bis(hydroxy alkoxy-phenyl) alkane having from 1 to about 4 carbon atoms in the alkoxy group and from 1 to about 10 carbon atoms in the alkane group, cyclohexane dialkanols having from 2 to about 10 carbon atoms in the alkanol groups, and alkylene glycols such as tetramethylene glycol having from 2 to about 10 carbon atoms in the alkylene group.

The type (b) crosslinking compounds used in the present invention to react with the above-described polyester binder materials are characterized by having a polymerizable functionality greater than 2.0. the polymerizable functionality of a given material is the number of hydroxy and carboxyl groups chemically bonded to the material which are capable of reacting to form an ester linkage, $$-\overset{\overset{\displaystyle O}{\|}}{C}-O-C-,$$

with the polyester binder materials. These type (b) crosslinking compounds are typically monomeric materials containing from 3 to about 20 carbon atoms. Representative type (b) crosslinking compounds include trimethylolethane, pentaerythritol, trimellitic acid anhydride, or pyromellitic acid or dianhydride, and the like.

The amount of type (b) crosslinking compound which may be used may vary widely depending on a number of factors including the reactivity of particular type (b) crosslinking compounds and type (2) polyester binder materials, the molecular weight of the respective polyester binder and type (b) crosslinking materials, etc. Typically, an amount of type (b) crosslinking compound greater than about 0.01 percent by weight, preferably from about 0.01 to about 5 percent by weight based on the total dry weight of the type (b) crosslinking compounds blended with the type (2) binder materials is employed.

In accord with another preferred embodiment of the invention a covalent crosslinked polymeric binder useful in the toner particles of the invention may be obtained simply [be] *by* curing a polymer having in its molecular structure crosslinking sites. A variety of chemical moieties which may serve as crosslinking sites in the molecular structure of a polymer are well known in the polymer art. Curing of polymers containing these sites may sometimes be accomplished by heat alone but is more generally facilitated by use of heat and a crosslinking compound (commonly referred to as a curing agent). Various catalysts may also be used in accord with conventional polymerization. Included below in Table 1 is a partial list of representative crosslinking sites and corresponding curing agents.

TABLE 1

| Crosslinking Site on Polymer | Crosslinking Compound (curing agent) |
|---|---|
| A. a carboxylic acid site such as methacrylic acid, for example, poly(styrene-co-methyl methylacrylate-co-2 ethylhexyl-methacrylate-co-methacrylic acid) | A-1 a diepoxide such as isopropylidene bis(phenyl glycidyl ether) having the formula 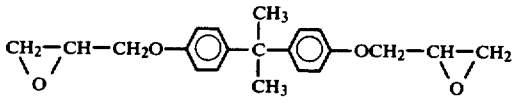 |
| | A-2. a carbodiimide such as dicyclohexylcarbodiimide having the formula $C_6H_{11}N{=}C{=}NC_6H_{11}$ |
| | A-3. a dihalide such as α,α'-dichloro-p-xylene having the formula 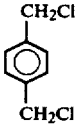 |
| | together with a tertiary amine catalyst |
| B. an epoxide site such as glycidyl methacrylate, for example, poly(styrene-co-ethylhexyl methacrylate-co-glycidyl methacrylate-co-methyl methacrylate9 | B-1. a dicarboxylic acid such as schacic acid |
| | B-2. a primary amine or a secondary amine |
| C. a halide site such as vinyl benzyl chloride, for example, poly(styrene-co-ethylhexyl methacrylate-co-methyl methacrylate-co-vinyl benzyl chloride) | C-1. a primary amine or a secondary amine |
| D. an active methylene site such as ethyl acrylyl acetate, for example, poly(styrene-co-methyl methacrylate-co-ethylhexyl acrylate-co-ethyl acrylyl acetate) | D-1. formaldehyde |
| E. ethylenic unsaturation site such as butadiene, for example, poly(styrene-co-methyl methylacrylate-co-ethylhexyl methacrylate-co-butadiene) | E-1. elemental sulfur admixed with a sulfur-containing compound such as 2-mercaptobenzothiazole |
| F. a hydroxyl site such as hydroxyethyl methacrylate, for example, poly(styrene-co-methyl methacrylate-co-ethylhexyl methacrylate-co-hydroxyethyl methacrylate) | F-1. a diisocyanate such as toluene diisocyanate |
| | F-2. a melamine curing agent such as a melamine-formaldehyde resin or hexamethylolmelamine |

In accord with another embodiment of the invention, the covalently crosslinked polymeric binders employed in the invention may be prepared without a separate chemical crosslinking compound. For example, many polymeric materials having an appropriate crosslinking site may be covalently crosslinked simply by exposure to an external activating radiation source, such as electron beam or electromagnetic radiation, for example, ultraviolet radiation.

Representative of thermoplastic, radiation crosslinkable materials useful in the preparation of the covalently crosslinked toner materials described herein are the cinnamylidenemalonate-containing polyesters such as those described in U.S. Pat. No. 3,674,745 issued July 4, 1972 incorporated herein by reference thereto. Such polymers are typically prepared by reacting a monomeric mixture of approximately 50 mole percent of one of more polyhydric alochols and 50 mole percent of a composition comprising dialkyl cinnamylidenemalonate and one or more additional esters of a dicarboxylic acid such as terephthalic acid or isophthalic acid. Typical of useful cinnamylidenemalonate-containing polymers are poly(ethylene glycol-codimethyl terephthalate-co-butanediol-co-dimethyl cinnamylidenemalonate) tetrapolymers composed of about 37.5 mole percent ethylene glycol units, 6.85 mole percent dimethyl terephthalate units, 12.5 mole percent butanediol units, and 43.15 mole percent dimethyl cinnamylidenemalonate units.

The above-described cinnamylidenemalonate-containing polymers are typically covalently crosslinked by exposure to ultraviolet radiation for a period of from about 1 to about 30 hours or more.

The ionic crosslinked binders employed in the present invention are conveniently prepared in a manner similar to that described above wherein covalent crosslinked binders are prepared by curing the polymeric binder in the presence of heat aone or in the presence of heat and curing agent to form covalent chemical linkages between the crosslinking sites of adjacent polymers. The difference between ionic crosslinked binders and the above-described covalently crosslinked binders prepared by curing is that in the former case the linkage between crosslinking sites of adjacent polymer chains is an ionic linkage rather than an actual covalent chemical bond. The ionic linkage may be conveniently formed by subjecting a polymeric binder having ionic crosslinking sites in its molecular structure to heat in the presence of an ionic crosslinking compound or by admixing the ionic crosslinking compound in a solution of the polymeric binder to be ionically crosslinked as described in Example VI hereinafter.

Regardless of the particular chemical composition of the crosslinked binders used in the present invention, preferred crosslinked binders have a softening temperature within the range of from about 40° C. to about 200° C. so that the resultant toner particles can readily be fused to conventional receiving sheets to form a permanent image. Especially useful crosslinked binders are those having a softening temperature within the range of from about 40° C. to about 65° C. because toners containing these binders may be used in high speed electrographic copy machines employing plain paper as the receiving sheet to which the toned images are fused. Of course, where other types of receiving elements are used, for example, synthetic high melting point polymeric sheets, metallic sheets, and the like, crosslinked polymers having a softening temperature higher than the values specified may be used.

As used herein the term "softening temperature" refers to the softening temperature of a polymer as measured by E. I. duPont de Nemours Model 941 TMA (Thermal Mechanical Analyzer) apparatus using a probe pressure of 48 p.s.i.a. and a heating rate of 5° C./minute.

The toner particles employed in the present invention may comprise varied amounts of the crosslinked binder polymer described hereinabove depending upon a number of factors, including the amount and types of colorant or other modifying materials, if any, incorporated in the particle; the amount and kind of additional binder materials, if any, such as conventional linear or straight-chain thermoplastic polymers, incorporated in the toner particle; the desired softening point of the toner particles, and the like. Advantageously, the crosslinked fusible binder comprises 25 percent by weight or more of the toner particles used in the invention. In accord with preferred embodiments of the invention where the toner particles of the invention are to be used in relatively high speed office copy devices, it has been found advantageous to use toner particles comprising at least 50 percent by weight, and preferably 75–95 percent by weight, of the crosslinked binder polymers described above.

The toner particles of the present invention can be prepared by various methods, such as melt-blending, etc. Particles having an average diameter between about 0.1 micron and about 100 microns may be used, although present day office copy devices typically employ particles having an average diameter between about 1.0 and 30 microns. However, larger particles or smaller particles can be used where desired for particular methods of development or particular development conditions. For example, in powder cloud development such as described in U.S. Pat. No. 2,691,345, issued Oct. 12, 1954, extremely small toner particles on the order of about 0.01 microns may be used.

The above-noted melt-blending method for preparing the toner composition of the present invention involves melting a powdered form of binder polymer and mixing it with other necessary or desirable addenda including colorants such as dyes or pigments. The polymer can readily be melted on heated compounding rolls which are also useful to stir or otherwise blend the polymer and addenda so as to promote the complete intermixing of these various ingredients. After thorough blending, the mixture is cooled and solidified. The resultant solid mass is then broken into small particles and finely ground to form a free-flowing powder of toner particles having the desired size.

A variety of colorant materials selected from dyestuffs and/or pigments are advantageously employed in the toner materials of the present invention. Such materials serve to color the toner and/or render it more visible. Of course, suitable toner materials having the appropriate charging characteristics can be prepared without the use of a colorant material where it is desired to have a developed image of low optical opacity. In those instances where it is desired to utilize a colorant, the colorants used, can, in principle, be selected from virtually any of the compounds mentioned in the Colour Index, Volumes 1 and 2, Second Edition.

Included among the vast number of useful colorants would be such materials as Hansa Yellow G (C. I. 11680), Nigrosine Spirit soluble (C.I. 50415) Chromogen Black ETOO (C.I. 45170), Solvent Black 3 (C.I. 26150), Fuchsine N (C.I. 42510), C.I. Basic Blue 9 (C.I. 52015), etc. Carbon black provides a particularly useful colorant. The amount of colorant added may vary over a wide range, for example, from about 1 to about 20 percent of the weight of the crosslinked binder. Particularly good results are obtained when the amount is from about 2 to about 10 percent. In certain instances, it may be desirable to omit the colorant, in which case the lower limit of concentration would be zero.

Other modifying materials such as various long chain anionic or cationic surfactants, conductive materials, and magnetic materials may also be incorporated, if desired, in the toner particles of the invention. Still other toner additives which may be incorporated in the toner particles are materials such as those described in Jacknow et al., U.S. Pat. No. 3,577,345 issued May 4, 1971. Generally, if any of the various modifying materials described above are used in the toner particles of the invention, the total amount thereof (excluding the weight of colorants) should be less than about 30 weight percent of the total weight of the toner particle.

The toners of this invention can be mixed with a carrier vehicle to form developing compositions. The carrier vehicles which can be used with the present toners to form new developer compositions can be selected from a variety of materials. Suitable carrier vehicles useful in the invention include various nonmagnetic particles such as glass beads, crystals of inorganic salts such as sodium or potassium chloride, hard resin particles, metal particles, etc. In addition, magnetic carrier particles can be used in accordance with the invention.

Suitable magnetic carrier particles are particles of ferromagnetic materials such as iron, cobalt, nickel, and alloys and mixtures thereof. Other useful magnetic carriers are ferromagnetic particles overcoated with a thin layer of various film-forming resins, for example, the alkali-soluble carboxylated polymers described in Miller, U.S. Pat. No. 3,547,822 issued Dec. 15, 1970; Miller, U.S. Pat. No. 3,632,512 issued Jan. 4, 1972; McCabe, U.S. Ser. No. 236,765, filed Mar. 21, 1972, entitled "Electrographic Carrier Vehicle and Developer Composition—Case B", Kasper et al U.S. Ser. No. 236,584, filed Mar. 21, 1972, entitled "Electrographic Carrier Vehicle and Developer Composition—Case C"; and Kasper U.S. Ser. No. 236,614, filed Mar. 21, 1972, entitled, "Electrographic Carrier Vehicle and Developer Composition—Case *D*." Other useful resin coated magnetic carrier particles include carrier particles coated with various fluorocarbons such as polytetrafluoroethylene, polyvinylidene fluoride, and mixtures thereof including copolymers of vinylidene fluoride and tetrafluoroethylene.

[Aa] *A* typical developer composition containing the [abovedescribed] *above-described* toner and carrier particles generally comprises from about 1 to about 15 percent by weight of particular toner particles and from about 85 to about 99 percent by weight carrier particles. Typically, the carrier particles are larger than the toner particles. Conventional carrier particles used in cascade or magnetic brush development have an average size particle size on the order of from about 30 to about 1200 microns, preferably 60–300 microns.

The above-described toner and developer compositions can be used to develop electrostatic charge patterns. Such developable charge patterns can be prepared by a number of well-known means and be carried, for example, on a light sensitive photoconductive element or a non-light sensitive dielectric-surfaced receiving element. Suitable dry development processes include cascading a cascade developer composition across the electrostatic charge pattern as described in detail in U.S. Pat. Nos. 2,618,551; 2,618,552; and 2,638,416. Another process involves applying toner particles from a magnetic brush developer composition as described in U.S. Pat. No. 3,003,462. Still another useful development process is powder-cloud development wherein a gaseous medium such as air is utilized as a carrier vehicle to transport the toner particles to the electrostatic charge pattern to be developed. This development process is more fully described in U.S. Pat. No. 2,691,345 and U.S. Pat. No. 2,725,304. Yet another development process is fur brush development wherein the bristles of a brush are used to transport the toner particles to the electrostatic charge pattern to be developed. This development process is more fully described in Walkup, U.S. Pat. No. 3,251,706.

As will be apparent from the above discussion the improved electrographic development process of the present invention using the toner particles described herein can employ various types of carrier vehicles ranging from the conventional inorganic particles used in cascade development and magnetic particles used in magnetic brush development to gaseous media and fur brushes used in powder cloud and fur brush development, respectively.

After imagewise deposition of the toner particles in accord with the process of the invention, the image can be fused as described earlier herein to adhere it to the substrate bearing the toner image. If desired, the unfused image can be transferred to another support such as a blank sheet of copy paper and then fused to form a permanent image thereon.

The following examples are included for a further understanding of this invention.

EXAMPLE I

Crosslinking a styrene-acrylic polymer with divinylbenzene during polymerization

| | |
|---|---|
| Polymer References | Ia |
| | Ib |
| | Ic |
| Toner References | I-1 |
| | I-2 |
| | I-3 |
| | I-4 |
| | Xerox 3600–7000 |

POLYMER DESCRIPTION:

Ia - A mixture of 50 kg. styrene, 25 kg. methyl methacrylate, 25 kg. ethylhexyl methacrylate, 2 kg. azobisisobutyronitrile is added with stirring over a 2½ hour period to 300 kg. of water at 75° C. containing 400 g. of poly(vinyl alcohol) (Vinol 540, Airco). the polymerization is conducted under a nitrogen atmosphere and is allowed to continue for 4 hours after monomer addition is completed. The product is collected by filtration and washed with water. The resultant copolymer is identified as poly(styrene-co-methyl methacrylate-co-2-ethylhexyl methacrylate).

Ib - This polymer is prepared in a manner identical to Ia except that 0.2 weight percent (based on the weight of the initial monomers) of divinylbenzene (assay 55 percent) are introduced into the initial monomer mixture. The resultant crosslinked copolymer is identified as poly(styrene-co-methyl methacrylate-co-2-ethylhexyl methacrylate-co-divinylbenzene).

Ic - This polymer is prepared in a manner identical to Ia except that 0.3 weight percent (based on the weight of the initial monomers) of divinylbenzene (assay 55 percent) are introduced into the initial monomer mixture. The resultant crosslinked polymer is identified as poly(styrene-co-methyl methacrylate-co-2-ethylhexyl methacrylate-co-divinylbenzene).

TONER DESCRIPTION

I-1 is an uncrosslinked control toner and is prepared by compounding on a two roll rubber mill 100 parts Ia and 5 parts Regal 300R carbon black purchased from Cabot Corporation. The composition is ground to toner size particles (2–40 microns) in a fluid energy mill.

I-2 is a control toner prepared in a manner identical to that described in I-1 above except that the resultant toner particles are subjected to a glow discharge post treatment as described in U.S. Pat. No. 3,676,350 to effect surface crosslinking of the toner particles. The glow discharge post treatment is carried out by placing a sample of the I-1 toner particles described above on a piece of filter paper contained within a polymeric holder capable of vibrating the toner, and the holder is placed between two parallel electrodes. The apparatus is contained in a bell jar which is evacuated to a pressure of 0.6 mm of mercury. Helium is then bled into the bell jar to a total of 2.4 mm of mercury. The vibrator is turned on, and a 10 kc A.C. field sufficient to produce a glow at a current of 60 ma is applied across the electrodes. To prevent fusing of the toner, the current is turned off at regular intervals. Total time the toner is subjected to the glow discharge is 5 minutes. The glow discharge treated toner is labelled I-2. Samples of the I-1 and I-2 control toners are placed in an oven at 60° C. for 24 hours and then checked for tendency to cake or agglomerate. I-2 becomes free flowing after several taps on its container, but I-1 does nsot. A spatula is required to break up the lumps formed in the I-1 container. This experiment demonstrates that the surface characteristics of the toner are indeed altered by a glow discharge treatment. Roller fusing tests for I-1 and I-2 are carried out in the manner noted below. The results are set forth in Table 2.

I-3 is a control toner prepared in a manner similar to that described in Example 1 of U.S. Re. Pat. No. 25,136 reissued Mar. 13, 1962. These toner particles consist of 25 percent by weight poly(butylmethacrylate) sold by E. I. duPont de Nemours under the trademark Elvacite 2044, 65 percent by weight of a blend of polymerized styrenes [commerically] *commercially* available under the trademark Piccolastic Resin D-125, and 10 percent by weight of carbon black. This control is noted to have particularly poor keeping properties, i.e., it tends to clump up and agglomerate, in comparison to the crosslinked toner used in the invention.

I-4 is a crosslinked toner of the invention prepared by compounding on a two roll rubber mill 100 parts Ib with 5 parts Regal 300R carbon black. The composition is ground to toner size particles in a fluid energy mill.

I-5 is a crosslinked toner of the invention prepared similarly to I-1 except that Ic is used as the polymer binder. Xerox 3600–7000 toner is a control and is commercially available from the Xerox Corporation. The polymer components of the toner are believed to be composed of an uncrosslinked copolymer of styrene and n-butyl methacrylate plus a small amount of poly(vinyl butyral).

ROLLER FUSER PERFORMANCE

Fixing of the toner to the paper is carried out with a roller fuser apparatus described previously to yield the following results:

TABLE 2

| Toner | Description | Minimum Adequate Fusing Temp. (°C.) | Hot Off-set Temp. (°C.) | Useful Fusing Range (°C.) |
|---|---|---|---|---|
| I-1 | Control | 135 | 218 | 83 |
| I-2 | Control | 135 | 218 | 83 |
| I-3 | Control | 121 | 163 | 42 |
| I-4 | Crosslinked | 135 | 232 | 97 |
| I-5 | Crosslinked | 135 | >260 | >125 |
| Xerox 3600–7000 | Control Commercial toner | 135 | 204 | 69 |

From Table 2, it is noted that the useful range of the crosslinked toner particles used in the present invention has been increased in comparison to the control toner compositions which are composed of various related, but uncrosslinked, binders. It may be further observed that crosslinking only the surface of polymeric binder containing toner particles does not provide any substantial change in the useful fusing range of the toner particles. (Compare I-1 control to I-2 control).

EXAMPLE II:

Crosslinking a styrene-acrylic polymer with 1,3-butylene dimethacrylate during polymerization

| | | |
|---|---|---|
| Polymer References: | Ia<br>IIa | of Example I |
| Toner References: | I-1<br>II-1 | of Example I |

POLYMER DESCRIPTION

Ia [poly(styrene-co-methyl)] *poly (styrene-co-methyl* methacrylate-co-2-ethylhexyl methacrylate) described in Example I IIa This is a polymer prepared in a manner identical to polymer Ia of Example I except that 0.75 weight percent (based on the weight of the initial monomers) of 1,3-butylene dimethacrylate crosslinking monomer is added as one of the initial monomeric reactants. The resulting crosslinked polymer is identified as poly(styrene-co-methyl methacrylate-co-2-ethylhexyl methacrylate-co-1,3-butylene dimethacrylate).

TONER DESCRIPTION

I-1 is an uncrosslinked control toner and is described in Example I.

II-1 is a crosslinked toner prepared by compounding on a two roll rubber mill 100 parts IIa with 5 parts Regal 300R carbon black. The composition is ground to toner size particles in a fluid energy mill.

ROLLER FUSER PERFORMANCE

The toners are tested on a roller fuser as described previously to yield the following results.

TABLE 3

| Toner | Description | Minimum Adequate Fusing Temp. (°C.) | Hot Off-set Temp. (°C.) | Useful Fusing Range (°C.) |
|---|---|---|---|---|
| I-1 | control | 135 | 218 | 83 |
| II-1 | crosslinked | 135 | >260 | >125 |

The data from Table 3 indicate that the useful fusing range has been increased more than 42° C. by crosslinking the toner.

EXAMPLE III:

Crosslinking a polyester during polymerization

| | |
|---|---|
| Polymer References: | IIIa<br>IIIb |
| Toner References: | III-1<br>III-2 |

POLYMER DESCRIPTION

IIIa. A mixture of 50 g. of dimethyl isophthalate, 50 g. dimethyl terephthalate, 67 g. ethylene glycol, 10 mg. zinc acetate, and 20 mg. antimony trioxide is heated under nitrogen at 200° C., and the evolved methanol is distilled off. The temperature is raised to 235° C., and vacuum is gradually applied to the stirred melt to remove excess glycol. Polymerization proceeds by the removal of glycol until the desired viscosity is reached. The resultant copolymer is identified as poly(ethylene terephthalate-co-isophthalate) and has an inherent viscosity of 0.25 (The inherent viscosity is measured at 25° C. by dissolving 0.25 g. of the copolymer in 100 ml. of chloroform.)

IIIb. This polymer is made in the same manner as IIIa except after the initial ester exchange 2.9 g. of 2-hydroxymethyl-2-methyl-1,3-propanediol is added. The polymerization under vacuum is allowed to proceed until the product is no longer soluble in chloroform. The resultant polymer is identified as poly(ethylene terephthalate-co-isophthalate) crosslinked with 2-hydroxymethyl-2-methyl-1,3-propanediol.

TONER DESCRIPTION

III-1 is an uncrosslinked control and is prepared by compounding on a two roll rubber mill 100 parts IIIa with 6 parts Sterling FT carbon black purchased from Cabot Corporation with subsequent reduction to toner size particles in a fluid energy mill. III-2 is a crosslinked toner prepared similarly to III-1 except IIIb is used as the polymer binder.

ROLLER FUSER PERFORMANCE

The toners are tested on a roller fuser as described previously to yield the following results:

TABLE 4

| Toner | Description | Minimum Adequate Fusing Temp. (°C.) | Hot Offset Temp. (°C.) | Useful Fusing Range (°C.) |
|---|---|---|---|---|
| III-1 | control | 121 | 177 | 56 |
| III-2 | crosslinked | 135 | >260 | >125 |

The data in Table 4 indicate that the useful fusing range has been increased greater than 69° C. by crosslinking the toner.

EXAMPLE IV:

Crosslinking a styrene-acrylic polymer while compounding

| | |
|---|---|
| Polymer References: | Ia |
| | IVa |
| Toner References: | I-1 |
| | IV-1 |

POLYMER DESCRIPTION

Ia. poly(styrene-co-methyl methacrylate-co-2-ethylhexyl methacrylate) described in Example I IVa. A mixture of 100 g. styrene, 50 g. methyl methacrylate, 50 g. ethylhexyl methacrylate, 1 g. methacrylic acid, 4 g. azobisisobutyronitrile is flushed with nitrogen and heated at 60° C. for 20 hrs. The resultant polymers is identified as poly(styrene-co-methyl methacrylate-co-2-ethylhexyl methylacrylate-co-methacrylic acid). The methacrylic acid units of the resultant polymer serve as crosslinking sites.

TONER DESCRIPTION

I-1 is an uncrosslinked control toner and is described in Example I.

IV-1 is a crosslinked toner prepared by compounding on a two roll rubber mill 100 parts by weight of polymer IVa with 0.3 parts by weight triethylenediamine, 3 parts by weight Epon 1001 (an epoxy resin purchased from Shell Chemical Co.), and 5 parts by weight Regal 300R carbon black. During the compounding operation, the rheological properties of the melt changed from that characteristic of an uncrosslinked polymer to that typical of a crosslinked polymer. The compound is ground to toner size particles in a fluid energy mill.

ROLLER FUSER PERFORMANCE

The toners are tested on a roller fuser as described previously to yield the following results:

TABLE 5

| Toner | Description | Minimum Adequate Fusing Temp. (°C.) | Hot Offset Temp. (°C.) | Useful Fusing Range (°C.) |
|---|---|---|---|---|
| I-1 | control | 135 | 218 | 83 |
| IV-1 | crosslinked | 135 | 260 | 125 |

The data in Table 5 indicate that crosslinking the toner has increased the useful fusing range 42° C.

EXAMPLE V:

Crosslinking a styrene-acrylic polymer after compounding

| | |
|---|---|
| Polymer References: | Va |
| Toner References: | V-1 |
| | V-2 |

POLYMER DESCRIPTION - Va

A mixture of 300 g. styrene, 210 g. methyl methacrylate, 90 g 2-ethylhexyl acrylate, 50 g ethyl acrylacetate, and 18 g benzoyl peroxide is added dropwise with stirring over 2-3 hr. to 800 ml. of water at 75° C. containing 0.75 g of poly(vinyl alcohol). The polymerization is conducted under a nitrogen atmosphere and is allowed to continue for 12 hr. after monomer addition. The product is collected by filtration, washed with water, and dried. The polymer is identified as poly(styrene-co-methyl methacylate-co-2-ethylhexyl acrylate-co-ethyl acrylylacetate).

TONER DESCRIPTION 100 parts by weight of polymer Va is compounded with 5 parts by weight Regal 300R carbon black on a two roll rubber mill. The material is ground to pass through a 20 mesh screen and divided into two equal parts. V-1 is an uncrosslinked control toner and is prepared by taking one part of the foregoing compounded and ground material and grinding it further to toner size particles in a fluid energy mill. V-2 is a crosslinked toner prepared by taking the other part of the above-described material and placing it in a 35 percent aqueous formaldehyde solution adjusted to pH9 with sodium hydroxide. The mixture is tumbled for 48 hours and dried. The solubility of this material is determined in methylene chloride before and after the aqueous formaldehyde treatment. The matter is soluble before treatment and insoluble after treatment indicating that crosslinking has taken place. The material is ground to toner size particles in a fluid energy mill.

ROLLER FUSER PERFORMANCE

The toners are tested on a roller fuser as described previously to yield the following results:

TABLE 6

| Toner | Description | Minimum Adequate Fusing Temp. (°C.) | Hot Offset Temp. (°C.) | Useful Fusing Range (°C.) |
|---|---|---|---|---|
| V-1 | control | 149 | 218 | 69 |
| V-2 | crosslinked | 149 | >260 | >111 |

The data in Table 6 indicate that the useful fusing range has been increased by greater than 42° C. by crosslinking.

EXAMPLE VI:

Ionic crosslinking of a styrene-acrylic polymer

| | | |
|---|---|---|
| Polymer References: | Ia | of Example 1 |
| | VIa | |
| Toner References: | I-1 | of [example ]*Example* 1 |
| | VI-1 | |

POLYMER DESCRIPTION

Ia poly(styrene-co-methyl methacrylate-co-2-ethylhexyl methacrylate) as described in Example I VIa a mixture of 100 g. of styrene, 50 g. of methyl methacrylate, 25 g. of ethylhexyl methacrylate, 10 g. of methylacrylic acid and 6 g. of azobisisobutyronitrile is flushed with nitrogen and heated at 60° C. for 4 days. The resulting polymer is identified as poly(styrene-co-methyl methacrylate-co-ethylhexyl methacrylate-co-methacrylic acid). To ionically crosslink this polymer, fifty grams of this polymer is dissolved in 400 ml. of methylene chloride and to it is added 1.0 g. of calcium hydroxide, which is equivalent to the acid in the polymer. The suspension, in a bottle, is rolled for 24 hours. At the end of this time it is a thin gel. It is poured into a tray to evaporate most of the solvent and drying is completed in vacuum at 50° C. The resultant polymer is ionically crosslinked.

TONER DESCRIPTION

I-1 is an uncrosslinked control toner and is described in Example I.

VI-1 is an ionically crosslinked toner prepared by compounding on a two-roll rubber mill 100 parts VIa and 5 parts Regal 300R carbon black. The composition is then ground to toner size particles (2–40 microns) in a fluid energy mill.

ROLLER FUSER PERFORMANCE

Fixing of the toner to the paper is carried out with a roller fuser apparatus described previously to yield the following results:

TABLE 7

| Toner | Description | Minimum Adequate Fusing Temp. (°C.) | Hot Offset Temp. (°C.) | Useful Fusing Range (°C.) |
|---|---|---|---|---|
| I-1 | control | 149 | 232 | 83 |
| VI-1 | crosslinked | 163 | >260 | >97 |

The data in Table 7 indicate that the useful fusing range may be increased greater than 14° C. by the use of ionic crosslinking.

EXAMPLE VII:

Covalent Crosslinking of a Crystalline Polyester

| | |
|---|---|
| Polymer References: | VIIa |
| | VIIb |
| Toner References: | VII-1 |
| | VII-2 |

POLYMER DESCRIPTION

VIIa - A mixture of 39 g. of [demethyl] *dimethyl* isophthalate, 39 g. dimethyl terephthalate, 45 g. 1,4-butanediol and five drops of tetrabutyl orthotitanate is heated under nitrogen at 210° C. and the evolved methanol is distilled off. The temperature is raised to 235° C., and vacuum is gradually applied to remove excess diol. Polymerization proceeds by distillation of diol until the desired viscosity is reached. The resultant polymer is identified as poly(tetramethylene isophthalate-co-terephthalate) and is partially crystalline.

VIIb - This polymer is made in the same manner as above except after the initial ester exchange 3 g. of 2-hydroxymethyl-2-methyl-1,3-propanediol is added. The polymerization is allowed to proceed under vacuum until the product gels. The resultant polymer is identified as poly(tetramethylene isophthalate-co-terephthalate) crosslinked with 2-hydroxymethyl-2-methyl-1,3-propanediol, and it is partially crystalline. This polymer and similar polymers are partially crystalline. As a result, the toner prepared from this polymer exhibits good storage stability against caking, and the melt temperature of this polymer, about 125° C., allows the toner prepared using this polymer to be fused at a relatively low temperature.

TONER DESCRIPTION

VII-1 is an uncrosslinked control toner and is prepared by compounding on a two-roll rubber mill 100 parts VIIa and 5 parts Regal 300R carbon black. The compound is then ground to toner size particles (2–40 microns) in a fluid energy mill.

VII-2 is a crystalline crosslinked toner and is prepared by compounding on a two-roll rubber mill 100 parts VIIb and 5 parts Regal 300R carbon black. The compound is then ground to toner size particles (2–40 microns) in a fluid energy mill.

ROLLER FUSER PERFORMANCE

Fixing of the toner is carried out with a roller fuser apparatus described previously at a speed of 5 in/sec and a pressure of 15 lb/in.

TABLE 8

| Toner | Description | Minimum Adequate Fusing Temp. (°C.) | Hot Offset Temp. (°C.) | Useful Fusing Range (°C.) |
|---|---|---|---|---|
| VII-1 | Control | 107 | 107 | 0 |
| VII-2 | Crosslinked | 107 | 149 | 42 |

The data in Table 8 indicate the useful fusing range has been increased 42° C. by crosslinking the above-described partially crystalline polymer.

EXAMPLE VIII:

Approximately 3 to 4 weight percent each of crosslinked toners I-4, I-5, II-1, III-2, IV-1, V-2, VI-1 and VII-2 are mixed with from 96 to 97 weight percent of magnetic carrier particles having an average particle size within the range of about 100 to 250 microns to form a magnetic brush developer composition. A portion of each of these developers is used in a magnetic brush development process of the type described in U.S. Pat. No. 3,003,462 issued Oct. 10, 1961, as follows:

The developer composition is maintained during the development cycle in a loose, brushlike orientation by a magnetic field surrounding a rotatable non-magnetic cylinder having a magnetic means fixedly mounted inside. The magnetic carrier particles are attracted to the cylinder by the described magnetic field, and the crosslinked toner particles are held to the carrier particles by virtue of their opposite electrostatic polarity. Before and during development, the crosslinked toner acquires an electrostatic charge of a sign opposite to that of the carrier material due to triboelectric charging derived from their mutual frictional interaction. As this brushlike mass or magnetic brush of carrier and crosslinked toner particles is drawn across a photoconductive surface bearing an electrostatic image, the crosslinked toner particles are electrostatically attracted to an oppositely charged latent image and form a visible toner image corresponding to the electrostatic image. The developed crosslinked toner image is then transferred to a plain paper receiving sheet and fused.

Each of the aforementioned crosslinked toner compositions produces good quality images on the resultant plain paper receiving sheets.

The invention has been described in detail with particular reference to preferred embodiments thereof, but, it will be understood that variations and modifications can be effected within the spirit and scope of the invention.

We claim:

1. An electrographic developing composition comprising a mixture of finely-divided carrier particles and finely-divided crosslinked toner particles electrostatically attractable thereto, said toner particles having an average particle size within the range of about 0.01 to about 100 microns and comprising a fusible binder polymer, the molecular chains of said polymer being covalently crosslinked to an extent sufficient to extend the useful fusing range of said toner particles by at least about 10° C. relative to comparable uncrosslinked toner particles comprising the same binder polymer except in uncrosslinked form.

2. An electrographic developing composition comprising a mixture of from about 85 to about 99 percent by weight of finely divided carrier particles and from about 1 to about 15 percent by weight of finely-divided crosslinked toner particles electrostatically attractable thereto, said toner particles having an average particle size within the range of from about 0.1 to about 100 microns and comprising at least about 25 percent by weight of a fusible binder polymer, said polymer being covalently crosslinked to an extent sufficient (a) to provide a useful fusing range for said toner particles of at least about 90° C. and (b) to extend the useful fusing range of the toner particles by at least about 20° C. relative to comparable uncrosslinked toner particles comprising the same binder polymer except in uncrosslinked form.

3. An electrographic developing composition comprising a mixture of from about 85 to about 99 percent by weight of finely divided carrier particles and from about 1 to about 15 percent by weight of finely divided toner particles electrostatically attractable thereto, said toner particles having an average particle size of from about 0.1 to about 100 microns and comprising at least about 50 percent by weight of a fusible binder polymer, the improvement wherein said binder is a covalently crossliked polymeric reaction product of (1) one or more crosslinking organic compounds possessing two or more polymerizable ethylenically unsaturated groups and (2) one or more organic compounds possessing one polymerizable ethylenically unsaturated group, said binder being crosslinked to an extent sufficient (a) to provide a useful fusing range for said toner particles of at least about 90° C. and (b) to extend the useful fusing range of said toner particles by at least about 20° C. relative to comparable uncrosslinked toner particles comprising the same binder polymer except in uncrosslinked form.

4. An electrographic developing composition comprising a mixture of from about 85 to about 99 percent by weight of finely divided carrier particles and from about 1 to about 15 percent by weight of finely divided toner particles electrostatically attractable thereto, said toner particles having an average particle size within the range of from about 0.1 to about 100 microns and comprising at least about 50 percent by weight of a fusible polymeric binder, the improvement wherein said binder is a covalently crosslinked polymeric reaction product of (1) one or more crosslinking organic compounds possessing a polymerizable functionality greater than two and (2) a blend comprising a dicarboxylic acid and a polyhydric alcohol capable of reacting with one another to form a polymer having individual units thereof linked by ester groups, said binder being crosslinked to an extent sufficient (a) to provide a fusing range for said toner particles of at least about 90° C. and (b) to extend the useful fusing range of said toner particles by at least about 20° C. relative to comparable uncrosslinked toner particles comprising the same binder polymer in uncrosslinked form.

5. An electrographic developing composition comprising a mixture of from about 85 to about 99 percent by weight of finely divided carrier particles and from about 1 to about 15 percent by weight of finely divided tone particles electrostatically attractable thereto, said toner particles having an average particle size of from about 0.1 to about 100 microns and comprising at least about 50 percent by weight of a fusible polymeric binder, the improvement wherein said binder is a covalently crosslinked polymeric reaction product of a curing agent and a polymer having crosslinking sites along its molecular structure capable of reacting with said curing agent, said binder being crosslinked (a) to provide a useful fusing range for said toner particles of at least about 90° C. and (b) to an extent sufficient to extend the useful fusing range of said toner particles by at least about 20° C. relative to comparable uncrosslinked toner particles comprising the same binder polymer in uncrosslinked form.

6. The developer composition as defined in claim 5 wherein said crosslinking site on said polymer is selected from the group consisting of a carboxylic acid, an epoxide, a halide, an active methylene, an ethylenically unsaturated group, and a hydroxyl group.

7. An electrographic developing composition comprising a mixture of from about 85 to about 99 percent by weight of finely divided carrier particles and from about 1 to about 15 percent by weight of finely divided crosslinked toner particles electrostatically attractable thereto, said toner particles having an average particle size within the range of from about 0.1 to about 100 microns and comprising a dye and/or pigment as colorant and a fusible styrene-containing binder polymer, said binder polymer being covalently crosslinked (a) to provide a useful fusing range for said toner particles of at least about 90° C. and (b) to an extent sufficient to extend the useful fusing range of the toner particles by at least about 10° C. relative to comparable uncrosslinked toner particles comprising said styrene-containing polymer in uncrosslinked form.

8. The developer composition as defined in claim 7 wherein said covalently crosslinked styrene-containing polymer has a softening temperature within the range of about 40° C. to 200° C. and is a crosslinked polymeric reaction product of (1) at least one crosslinking organic compound having two or more polymerizable ethylenically unsaturated groups and (2) a blend of monomers having one polymerizable ethylenically unsaturated group and comprising from about 40 to 100 percent by weight of styrene or styrene homolog.

9. The developer composition as defined in claim 7 wherein said covalently crosslinked styrene-containing polymer has a softening temperature within the range of about 40° C. to 65° C. and comprises a polymeric reaction product of (1) at least one crosslinking organic compound possessing two or more polymerizable ethylenically unsaturated groups and (2) a monomeric blend comprising from about 40 to about 90 percent by weight of styrene or styrene homolog, from about 5 to about 50 percent by weight of a lower alkyl acrylate or methacrylate having from 1 to about 4 carbon atoms in the alkyl group thereof, and from about 5 to about 50 percent by weight of a higher alkyl acrylate or methacrylate having from about 6 to about 20 carbon atoms in the alkyl group thereof.

10. An electrographic developing composition comprising a mixture of from about 85 to about 99 percent by weight of finely divided magnetically attractable carrier particles and from about 1 to about 15 percent by weight of finely divided crosslinked toner particles electrostatically attractable thereto, said toner particles having an average particle size within the range of from about 0.1 to about 100 microns, and comprising at least about 75 percent by weight of a fusible binder polymer, said polymer having a softening temperature within the range of about 40° C. to 200° C. and being covalently crosslinked to an extent sufficient (a) to provide a useful fusing range for said toner particles of at least about 100° C. and (b) to extend the useful fusing range of the toner particles by at least about 40° C. relative to comparable uncrosslinked toner particles comprising said binder polymer in uncrosslinked form.

11. The developer composition of claim 4 wherein said polymer is a crystalline polymer.

12. An electrographic developing composition comprising a mixture of from about 85 to about 99 percent by weight of finely divided carrier particles and from about 1 to about 15 percent by weight of finely divided crosslinked toner particles electrostatically attractable thereto, said toner particles having an average particle size within the range of from about 0.01 to about 100 microns and comprising at least about 25 weight percent of a covalently crosslinked binder polymer, said polymer a polymeric reaction product of a mixture comprising (1) from about 0.01 to about 5 weight percent of one or more crosslinking organic compounds possessing two or more polymerizable ethylenically unsaturated groups and (2) one or more organic compounds possessing one polymerizable ethylenically unsaturated group.

13. An electrographic developing composition comprising a mixture of from about 85 to about 99 percent by weight of finely divided carrier particles and from about 1 to about 15 percent by weight of finely divided crosslinked toner particles electrostatically attractable thereto, said toner particles having an average particle size within the range of from about 0.1 to about 100 microns and comprising a pigment as colorant and at least about 50 percent by weight of a fusible covalently crosslinked styrene-containing polymer, said polymer a polymeric reaction product of a mixture comprising (1) from about 0.01 to about 5 weight percent of one or more crosslinking compounds possessing two or more polymerizable ethylenically unsaturated groups and (2) a monomeric blend having one polymerizable ethylenically unsaturated group and comprising from about 40 to 100 percent by weight of styrene or styrene homolog, said polymer having a softening temperature within the range of 40° C. to 200° C.

14. The developer composition as defined in claim [14] *13* wherein said polymer has a softening temperature within the range of from about 40° C. to about 65° C. and wherein said monomeric blend comprises from about 40 to about 90 percent by weight of styrene or styrene homolog and from about 10 to about 60 percent by weight of an alkyl acrylate or methacrylate having from about 1 to about 20 carbon atoms in the alkyl moiety.

15. In an electrographic imaging process wherein an electrostatic charge pattern is contacted with dry finely divided toner particles having an average particle size within the range of about 0.01 to about 100 microns comprising a fusible binder polymer to develop said charge pattern and, subsequently, the developed toner particle image corresponding to said charge pattern is fixed to a suitable receiving support by fusing said particles to said support, the improvement wherein (a) the molecular chains of said polymer are crosslinked, and remain crosslinked during fusing, to an extent sufficient to extend the useful fusing range of said toner particles by at least about 10° C. relative to comparable uncrosslinked toner particles comprising said binder polymer in uncrosslinked form and (b) said polymer has a crosslink bond energy in excess of about 8 kcal/mole.

16. An electrographic imaging process according to claim [16] *15* wherein said molecular chains are covalently crosslinked.

17. An electrographic imaging process according to claim [16] *15* wherein molecular chains are ionically crosslinked.

*18. A method for developing a latent electrostatic image bearing member comprising forming a latent electrostatic image on said member and applying a developer thereto, said developer including at least a toner where said toner is affected by said latent image to effect development thereof, said toner comprising a pulverized, colored, crosslinked, vinylic polymer resin obtained by (a) polymerizing the monomer thereof in the presence of a crosslinking agent of at least 0.01 percent by weight of the monomer, said crosslinking agent being a compound which forms a crosslinked polymer having a crosslink bond energy in excess of about 8 kcal/mole, (b) mixing at least one coloring material with the thus obtained resin and (c) pulverizing the obtained mixture.*

*19. A method as in claim 18 where said vinylic polymer resin is a homopolymer or a copolymer of at least two vinylic monomers.*

*20. A method as in claim 19 where said monomer is selected from the group consisting of styrene, chlorostyrene, vinyl-naphthalene, vinyl esters, ethylenic monocarboxylic acids and esters thereof, substituted ethylenic monocarboxylic acids, ethylenic dicarboxylic acids and substituted derivatives thereof, vinyl ketones, vinylidene halides, and N-vinyl compounds.*

*21. A method as in claim 19 where said monomer is selected from the group consisting of styrene, p-chlorostyrene, vinyl-naphthalene, ethylenic unsaturated monoolefins, acrylic acid and esters thereof, methacrylic acid and esters thereof, alkyl esters of alpha-ethylenic aliphatic dicarboxylic acids, vinyl ketones, vinyl esters, vinylidene halides, vinyl pyridines, vinyl quinolines and vinyl carbazoles.*

*22. A method as in claim 18 where the amount of said crosslinking agent is 0.01 to 5 percent by weight of the monomer.*

*23. A method as in claim 18 where the process of said application of said developer to the electrostatic latent image member comprises the magnetic brush developing process, the average particle size of said pulverized, colored, crosslinked vinylic polymer resin being from 1 to 30 microns.*

*24. A method as in claim 18 where the average particle size of said pulverized, colored, vinylic polymer resin is from 1 to 30 microns.*

*25. A method as in claim 18 including the steps of transferring the developed toner image to a copy sheet and fixing the transferred toner image onto a copy sheet by feeding the copy sheet by a heat fixing roller where the heated roller contacts the transferred toner image to thereby fix it into a copy sheet.*

*26. A method according to claim 18 wherein said crosslinking agent forms covalent crosslinks.*

*27. A method according to claim 18 wherein said crosslinking agent is a crosslinking organic compound possessing two or more polymerizable ethylenically unsaturated groups.*

*28. A method according to claim 27 wherein said crosslinking agent is selected from the group consisting of vinyl aromatic compounds; allyl-containing compounds; mixed allyl-vinyl compounds; vinylidene compounds; mixed allyl-vinylidene compounds; mixed vinyl-vinylidene compounds; crosslinking vinyl esters, allyl esters, and vinyl-allyl esters of polycarboxylic acids; and aliphatic acetylenes.*

*29. A method according to claim 18 wherein said crosslinking agent is selected from the group consisting of aromatic divinyl compounds and acrylic and methacrylic diesters of alkylene glycols.*

*30. A method as in claim 18 where the vinylic polymer resin is colored by a coloring material selected from the group consisting of dyes and pigments, the coloring material being no more than 20%by weight of the colored resin.*

*31. A method as in claim 30 wherein the coloring material is a pigment, the pigment being from about 2 to 10 percent by weight of the color resin.*

*32. A method for developing a latent electrostatic image bearing member comprising forming a latent electrostatic image on said member and applying a developer thereto, said developer including at least a toner where said toner is affected by said latent image to effect development thereof, said toner comprising a pulverized, colored, crosslinked, vinylic polymer resin obtained by (a) polymerizing the monomer thereof in the presence of a crosslinking agent of at least 0.01 percent by weight of the monomer, said crosslinking agent being selected from the group consisting of aromatic divinyl compounds, diethylenecarboxylate esters, and mixtures thereof, (b) mixing at least one coloring material with the thus obtained resin and (c) pulverizing the obtained mixture.*

*33. A method according to claim 32 wherein said crosslinking agent is divinyl benzene.*

* * * * *